July 4, 1950  J. D. GREENSTREET  2,513,931
TRAILER GUIDE
Filed Jan. 27, 1947  2 Sheets-Sheet 1
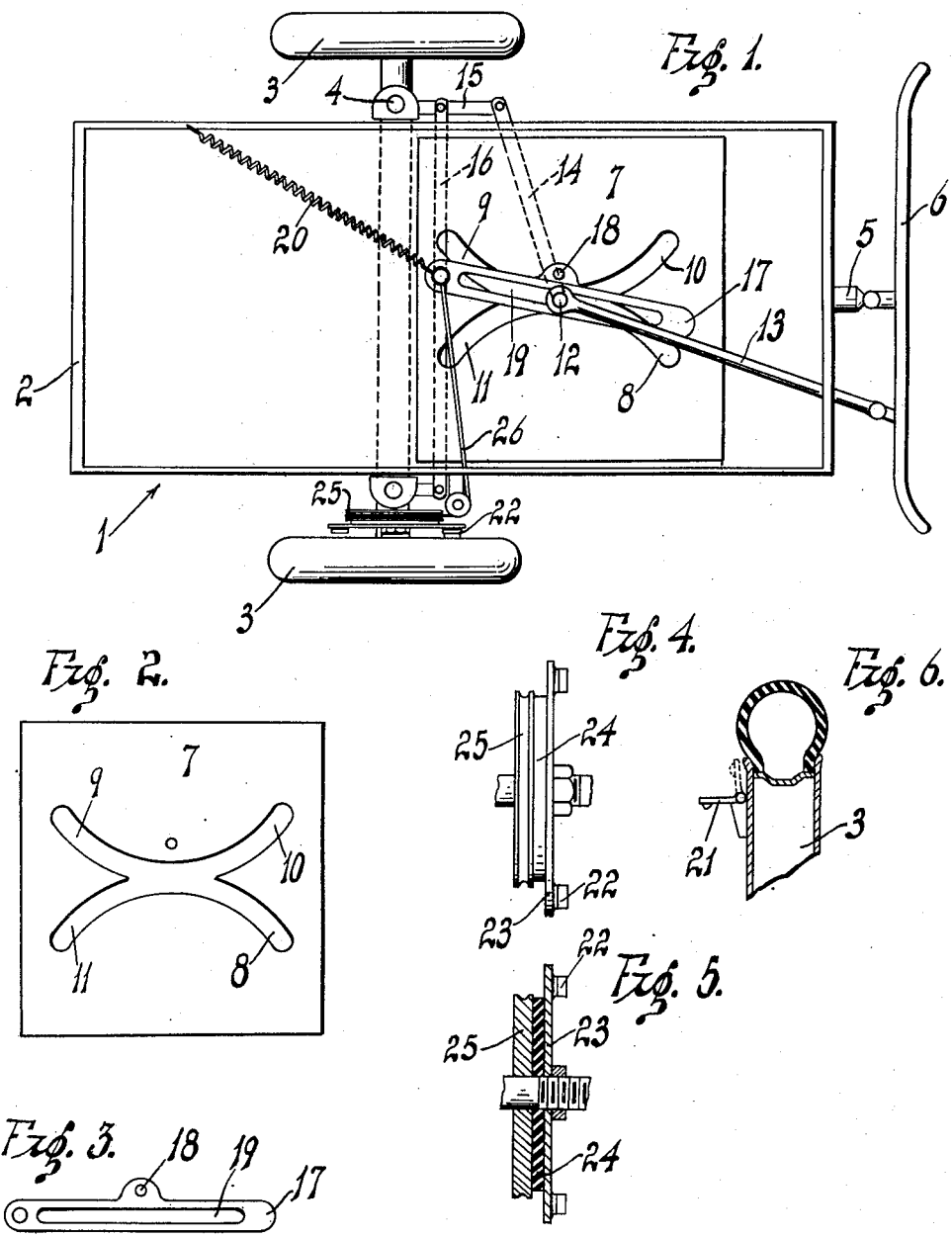
INVENTOR.
Jack D. Greenstreet.
BY
*H. A. Druckman*
ATTORNEY.

July 4, 1950     J. D. GREENSTREET     2,513,931
TRAILER GUIDE

Filed Jan. 27, 1947     2 Sheets—Sheet 2

INVENTOR.
Jack D. Greenstreet.
BY
ATTORNEY.

Patented July 4, 1950

2,513,931

UNITED STATES PATENT OFFICE 2,513,931

TRAILER GUIDE

Jack D. Greenstreet, Long Beach, Calif.

Application January 27, 1947, Serial No. 724,674

9 Claims. (Cl. 280—33.55)

This invention relates to a trailer guide or steering mechanism, whereby a trailer is caused to track directly in the path of the pulling vehicle.

An object of my invention is to provide a trailer guide which will accurately track the trailer in the path of the pulling vehicle on both forward and rearward movement of the pulling vehicle.

Another object is to provide a novel means of steering the wheels of a trailer whereby on forward movement of the pulling vehicle, the steering of the trailer wheels is controlled by one set of cams and on rearward movement of the pulling vehicle, a separate set of cams are engaged, and a further object is to provide a novel means of transferring the control from one set of cams to another, depending upon the direction of rotation of the wheels of the trailer.

A feature of my invention resides in the novel mechanical means of shifting the control from one set of cams to another, depending upon and controlled by the direction of rotation of the wheels of the trailer.

Still another feature of my invention is to provide a trailer guide which will properly steer the wheels of the trailer on both forward and rearward movement of the pulling vehicle.

Other objects, advantages and features of invention may appear from the accompanying drawing, the subjoined detailed description and the appended claims.

In the drawing:

Figure 1 is a plan view of my trailer guide mounted on a trailer.

Figure 2 is a plan view of the cam plate.

Figure 3 is a plan view of the shift link.

Figure 4 is a side elevation of the shifting clutch.

Figure 5 is a longitudinal sectional view of the same.

Figure 6 is a fragmentary transverse sectional view of the trailer wheel showing the leg mounted thereon.

Figure 7:
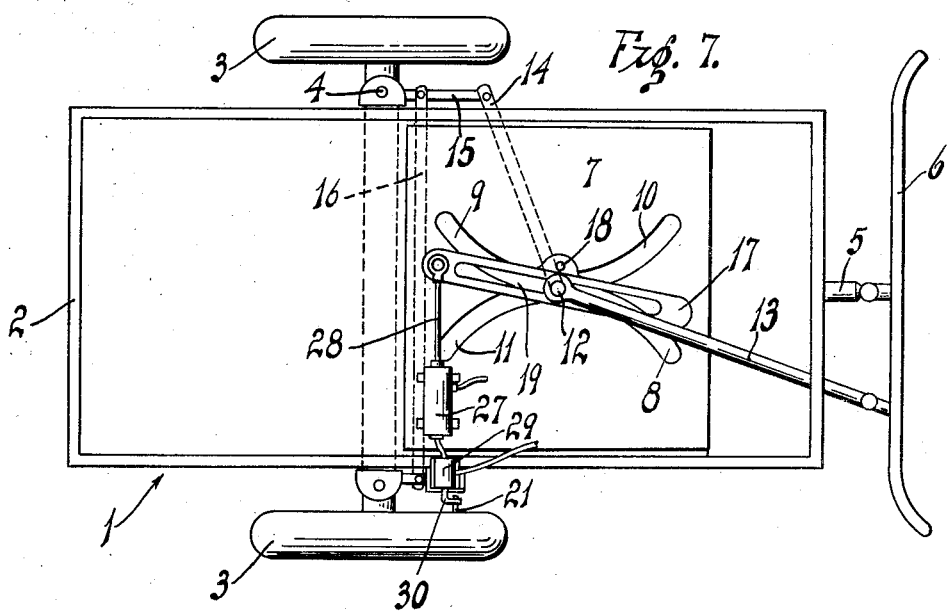
Figure 7 is a plan view of a slight modified form of trailer guide.

Referring more particularly to the drawing, the trailer 1 consists of a frame 2 which is mounted on steerable wheels 3—3. These wheels are pivotally mounted on a spindle 4, all of which is usual and well known in the art. The trailer is pulled by the draw bar 5 and is connected thereby to the pulling vehicle, the rear frame portion or bumper 6, of which is illustrated.

A cam plate 7 is fixedly attached to the frame 2 or may be an integral part thereof. This cam plate is formed with cam slots 8—9—10—11. These cam slots form an X-shape in the plate 7 substantially as shown. A pin 12 rides in these cam slots and is guided in a pair thereof, as will be further described.

An arm 13 is attached to the pin 12 and to the frame or bumper 6 and it will be evident as the frame or bumper moves with a change of direction of the pulling vehicle, the pin 12 will be moved either forwardly or rearwardly from the central position, shown in Figures 1 and 7. When the vehicle is moving in a forward direction, the cam slots 8 and 9 are used. When the pulling vehicle moves in a rearward direction, the cam slots 10 and 11 are used and the shifting of the movement of the pin 12 from one set of cam slots to another will be subsequently described.

A steering link 14 is attached to the pin 12 and is pivotally attached to an arm 15 which extends from the hub portion of one of the wheels 3. The usual drag link 16 connects the two wheels and causes these wheels to move in unison which is usual and well known in the art. A guide plate 17 rests upon the plate 7 and is pivotally mounted on this plate by the pin 18. The guide plate 17 is provided with an elongated slot 19 in which the pin 12 can move. A spring 20 (or similar return mechanism) is attached to the guide plate 17 and to the frame of the trailer 2. This spring normally urges and holds the guide plate 17 in the position shown in Figure 1. It will be evident that in this position of the guide plate, the pin 12 is guided into the cam slots 8 or 9, depending upon the direction in which the pulling vehicle moves the pin. This is the direction of forward movement of the pulling vehicle and when the pin 12 is moved into either of the cam slots 8 or 9, the link 14 will be actuated to move the wheels 3 in a direction to cause the trailer to accurately track the pulling vehicle. When the pulling vehicle moves rearwardly, the wheels 3 will be moved in just the opposite direction from the forward movement of the vehicle. To accomplish this, the guide plate 17 is swung on its pivot 18 and the pin 12 then moves in the slots 10—11. To accomplish this movement of the guide plate 17, I provide lugs 21 on one of the wheels 3. At high speeds, these lugs swing upwardly under centrifugal force, shown in dotted lines in Figures 6 and 8. At slow speeds (as when car is reversed) the lugs 21 are horizontal, and then engage projections 22 on a drum 23. In forward direction and also at slow speeds, the lugs 21, are also horizontal, and would engage the projections 22, however, the projections are so tapered that the lugs 21, will slip off in a forward direction. At higher speeds the lugs 21, will swing upwardly to escape the projections 22, thus eliminating any noise due to engagement of the lugs 21, with the projections 22. A friction disk 24 lies between the drum 23 and a spool 25, thereby causing the spool to rotate when the projections 22 are engaged by the lugs 21. A cable 26 wraps around the spool 25 and extends to the rear end of the guide plate 17. Thus when the spool 25 is caused to rotate, the cable 26 will be pulled, thus swinging the guide plate 17 on its pivot 18, and thereby guiding the pin 12 into either of the cam slots 10 or 11. This movement of the guide plate is accomplished against the tension of the spring 20 and as soon as the vehicle starts moving forwardly, the spring 20 will immediately return the guide plate 17 to the position shown in Figure 1. The guide plate 17, is moved by the cable 26, against the tension of the spring 20, and normally the spring will hold the guide plate in the position shown in Figure 1. This is the position for normal forward movement of the vehicle.

Figure 8:
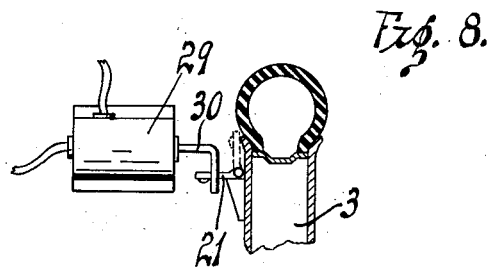
Figure 8 is a fragmentary transverse sectional view of the trailer wheel showing the leg engaging the valve.

The swinging movement of the guide plate 17 may also be accomplished by means of the pneumatic or hydraulic cylinder 27, the rod 28 of which is pivotally attached to the guide plate 17. The fluid movement to the cylinder 27 is controlled by the valve 29 and this valve is controlled by the stem 30 which is engaged by the lug 21 as shown in Figure 8. In operation, when the vehicle is moving forwardly, the parts will be positioned as shown in Figure 1. If the pulling vehicle turns to right or left, this turning movement will be transmitted into longitudinal movement of the arm 13. The pin 12, will then move into use of the cam slots 8, or 9, and will cause the wheels 3, to move in such a manner that the trailer will accurately track the pulling vehicle. When the pulling vehicle is reversed, a pull is exerted on the cable 26, due to the fact that the lugs 22, are engaged, and when this cable is pulled, the shift plate 17, will be rotated on its axis 18, thus guiding the pin 12, into use of the cam slots 10, or 11. Again the wheels 3, will be caused to move in such a way that the trailer will track the pulling vehicle and will turn in the same direction as the movement of the rear wheels of the pulling vehicle.

Having described my invention, I claim:

1. A trailer guide for trailers having steerable wheels, comprising a plate fixedly mounted on said trailer, said plate having cam slots formed therein, said cam slots intersecting, a pin extending through said plate and operable in said cam slots; an arm extending from said pin to the pulling vehicle, a steering link extending from said pin to a wheel of the trailer, and means guiding said pin from one cam slot to another, depending upon the direction of the movement of the trailer.

2. A trailer guide for trailers having steerable wheels, comprising a plate fixedly mounted on said trailer, said plate having cam slots formed therein, said cam slots intersecting, a pin extending through said plate and operable in said cam slots; an arm extending from said pin to the pulling vehicle, a steering link extending from said pin to a wheel of the trailer, and means guiding said pin from one cam slot to another, depending upon the direction of the movement of the trailer, said means comprising a cable extending from a drum on a wheel of the trailer, means on a wheel of the trailer engaging the drum on rearward movement of the trailer, said cable being attached to said means guiding the pin and actuating the same.

3. A trailer guide for trailers having steerable wheels, comprising a plate fixedly mounted on said trailer, said plate having cam slots formed therein, said cam slots intersecting, a pin extending through said plate and operable in said cam slots, an arm extending from said pin to the pulling vehicle, a steering link extending from said pin to a wheel of the trailer, and means guiding said pin from one cam slot to another, depending upon the direction of the movement of the trailer, said means comprising a cable extending from a drum on a wheel of the trailer, means on a wheel of the trailer engaging the drum on rearward movement of the trailer, a guide plate pivotally mounted adjacent said cams, said guide plate having an elongated slot therein in which said pin is adapted to move, said cable being attached to said guide plate and adapted and arranged to swing said guide plate on its pivot.

4. A trailer guide for trailers having steerable wheels, comprising a plate fixedly mounted on said trailer, said plate having cam slots formed therein, said cam slots intersecting, a pin extending through said plate and operable in said cam slots; an arm extending from said pin to the pulling vehicle, a steering link extending from said pin to a wheel of the trailer, and means guiding said pin from one cam slot to another, depending upon the direction of the movement of the trailer, and fluid operated means shifting said first named means as the trailer is moved forwardly or rearwardly.

5. A trailer guide for trailers having steerable wheels, comprising a plate fixedly mounted on said trailer, said plate having cam slots formed therein, said cam slots intersecting, a pin extending through said plate and operable in said cam slots; an arm extending from said pin to the pulling vehicle, a steering link extending from said pin to a wheel of the trailer, and means guiding said pin from one cam slot to another, depending upon the direction of the movement of the trailer, a fluid cylinder, guide means engaging said pin, said fluid cylinder being operatively connected to said guide means, and a control valve for said fluid cylinder, and means actuating said control valve on rearward movement of the trailer.

6. A trailer guide for trailers having steerable wheels, comprising a plate fixedly mounted on said trailer, said plate having cam slots formed therein, said cam slots intersecting, a pin extending through said plate and operable in said cam slots; an arm extending from said pin to the pulling vehicle, a steering link extending from said pin to a wheel of the trailer, and means guiding said pin from one cam slot to another, depending upon the direction of the movement of the trailer, a fluid cylinder, said guide means engaging said pin, and said fluid cylinder being operatively connected to said guide means, and a control valve for said fluid cylinder, said control valve being actuated on rearward movement of the trailer by means of a lug on a wheel of the trailer, said valve including a stem engageable by the lug on rearward movement of the trailer.

7. A trailer guide for trailers, including steerable wheels thereon, a plate fixedly attached to the trailer, said plate having X-shaped cam slots therein, a pin movable in said slots, an arm extending from said pin to the pulling vehicle, a steering link extending from the pin to a wheel of the trailer, a guide plate pivotally mounted adjacent the cam slots, said guide plate having an elongated slot therein, in which said pin moves and means operable on rearward movement of the trailer to swing said shift plate on its pivot, and direct said pin from one cam slot to another.

8. A trailer guide for trailers, including steerable wheels thereon, a plate fixedly attached to the trailer, said plate having X-shaped cam slots, a pin movable in said slots, an arm extending from said pin to the pulling vehicle, a link extending from the pin to a wheel of the trailer, a shift plate pivotally mounted adjacent the cam slots, said shift plate having an elongated slot therein, in which said pin moves and means operable on rearward movement of the trailer to swing said shift plate on its pivot, and direct said pin from one cam slot to another, said shift means including a cable attached to the shift plate, a spool on which the cable is wrapped, said spool being engaged and rotated on rearward movement of the trailer.

9. A trailer guide for trailers, including steerable wheels thereon, a plate fixedly attached to the trailer, said plate having X-shaped cam slots, a pin movable in said slots, an arm extending from said pin to the pulling vehicle, a link extending from the pin to a wheel of the trailer, a shift plate pivotally mounted adjacent the cam slots, said shift plate having an elongated slot therein, in which said pin moves and means operable on rearward movement of the trailer to swing said shift plate on its pivot, and direct said pin from one cam slot to another, said means including a fluid cylinder, a valve connected to said fluid cylinder, said fluid cylinder being operatively connected to the shift plate and means on a wheel of the trailer engaging the valve to actuate the same on rearward movement of the trailer.

JACK D. GREENSTREET.

REFERENCES CITED

The following references are of record in the file of this patent:

UNITED STATES PATENTS

| Number | Name | Date |
|---|---|---|
| 1,245,054 | Spencer | Oct. 30, 1917 |
| 1,247,201 | Yoder | Nov. 20, 1917 |
| 1,856,997 | Jacobs | May 3, 1932 |
| 2,174,493 | Vanderwerf | Sept. 26, 1939 |